(12) United States Patent
Cariffe (10) Patent No.: US 6,281,872 B1
(45) Date of Patent: Aug. 28, 2001

(54) ROTATION OF AN IMAGE IMPLEMENTING AN INDEPENDENT MIRROR ATTRIBUTE

(75) Inventor: Alan Eddy Cariffe, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/059,073

(22) Filed: Apr. 9, 1998

(51) Int. Cl.[7] .............................. G09G 5/34; G06F 3/00
(52) U.S. Cl. ................................. 345/126; 345/326
(58) Field of Search .......................... 345/11, 121, 973, 345/126, 184, 441, 436, 974, 419, 358, 520, 437–438, 26

(56) References Cited

U.S. PATENT DOCUMENTS

| 3,962,536 | * | 6/1976 | Busch | 345/126 |
| 4,660,028 | * | 4/1987 | Yu | 345/26 |
| 5,533,185 | * | 7/1996 | Lentz et al. | 345/126 |
| 5,671,440 | * | 9/1997 | Curry | 345/437 |
| 6,054,990 | * | 4/2000 | Tran | 345/358 |
| 6,208,325 | * | 3/2001 | Reddy et al. | 345/126 |

OTHER PUBLICATIONS

*Soap Explorer Guide*, Version 1.0 , available from Meta-Tools Visual Computing Software Co., 6603 Carpinteria Ave. Carpentinteria, CA 93013, pp. 20,21.

* cited by examiner

*Primary Examiner*—Matthew Luu
*Assistant Examiner*—Chanté Harrison (57) ABSTRACT

A rotation interface for an image is implemented. In response to a rotation control selecting a current angle of rotation, an image is rotated to the current angle of rotation. In response to a mirroring attribute control being selected, the image is mirrored by flipping the image around a first axis. The first axis is varied from vertical by the current angle of rotation. Selecting a flip control results in flipping the image. The current angle of rotation for the rotation control is adjusted by 180°. Also, the current state of the mirroring attribute control is changed to reflect a current mirrored state of the image resulting from flipping the image.

20 Claims, 8 Drawing Sheets

ROTATION OF AN IMAGE IMPLEMENTING AN INDEPENDENT MIRROR ATTRIBUTE

BACKGROUND

The present invention concerns editing images and pertains specifically to a rotation interface in which rotation of an image is performed independently of a mirror attribute.

Image editing programs generally include some functionality which allows for an image to be rotated. Additionally, the same image editing programs often include the ability to "flip" the image around a horizontal axis and/or to "mirror" the image around a vertical axis.

SUMMARY OF THE INVENTION

In accordance with the preferred embodiment of the present invention, a rotation interface for an image is implemented. In response to a rotation control selecting a current angle of rotation, an image is rotated to the current angle of rotation. For example, the rotation control is a slider bar, a rotate left 90° button, or a rotate right 90° button. In response to a mirroring attribute control being selected, the image is mirrored by flipping the image around a first axis. The first axis is varied from vertical by the current angle of rotation.

In the preferred embodiment of the present invention, selecting a flip control results in flipping the image. The current angle of rotation for the rotation control is adjusted by 180°. Also, the current state of the mirroring attribute control is changed to reflect a current mirrored state of the image resulting from flipping the image.

The present invention provides for a rotation interface wherein the rotation operations are distinct from a separate image attribute-setting control for mirroring. Because mirroring is designated as an image attribute, users always will see either the normally rotated image, at any angle, or will see an image which has been first mirrored and then rotated to any angle.

DESCRIPTION OF THE PREFERRED EMBODIMENT

Figure 1:
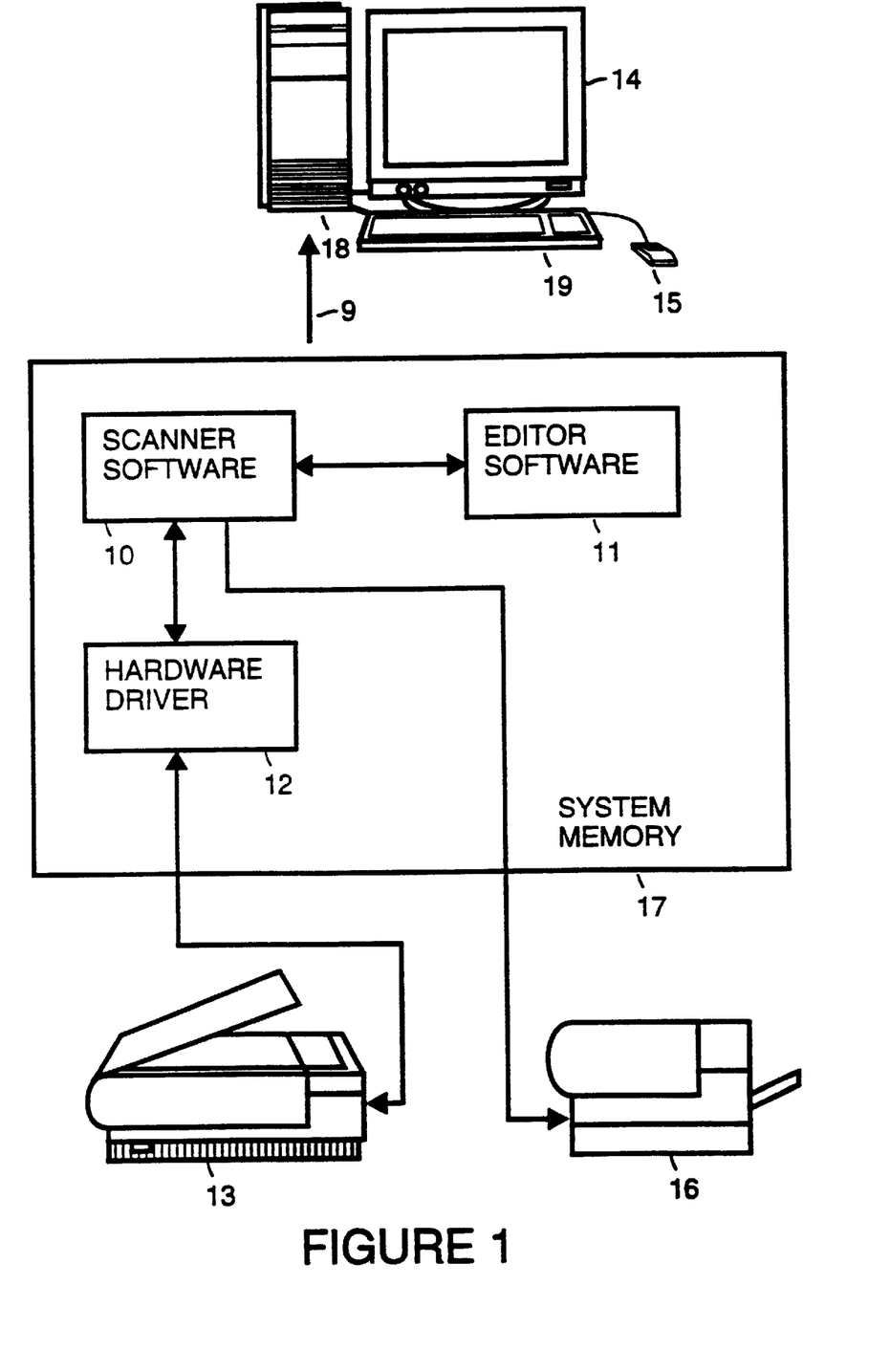
FIG. 1 is a block diagram of a scanner system used to generate a digitally represented image.

FIG. 1 shows a block diagram of a scanner system which may be used to produce digitally represented images. A computer 18 is shown connected to monitor 14. Also connected to computer 18 is a keyboard 19 and a mouse 15.

Scanner software 10 interacts with a hardware driver 12 to cause scanner hardware 13 to scan a picture placed upon scanner 13. Upon successful retrieval of an image of the picture, the image is displayed upon a monitor 14 for view by a user. A user may then modify the image using editor software 11 and/or print out the image using a printer 16. Scanner software 10, hardware driver 12 and editor software 11 all reside within a system memory 17, as shown by FIG. 1. As demonstrated by arrow 9, memory 17 resides in computer 18.

While FIG. 1 illustrates one way of obtaining a digitally represented image, other means may be used to obtain digitally represented images. For example, digitally represented images may be generated by a drawing program, captured by a digital camera, or retrieved from a library of such images.

Figure 2:
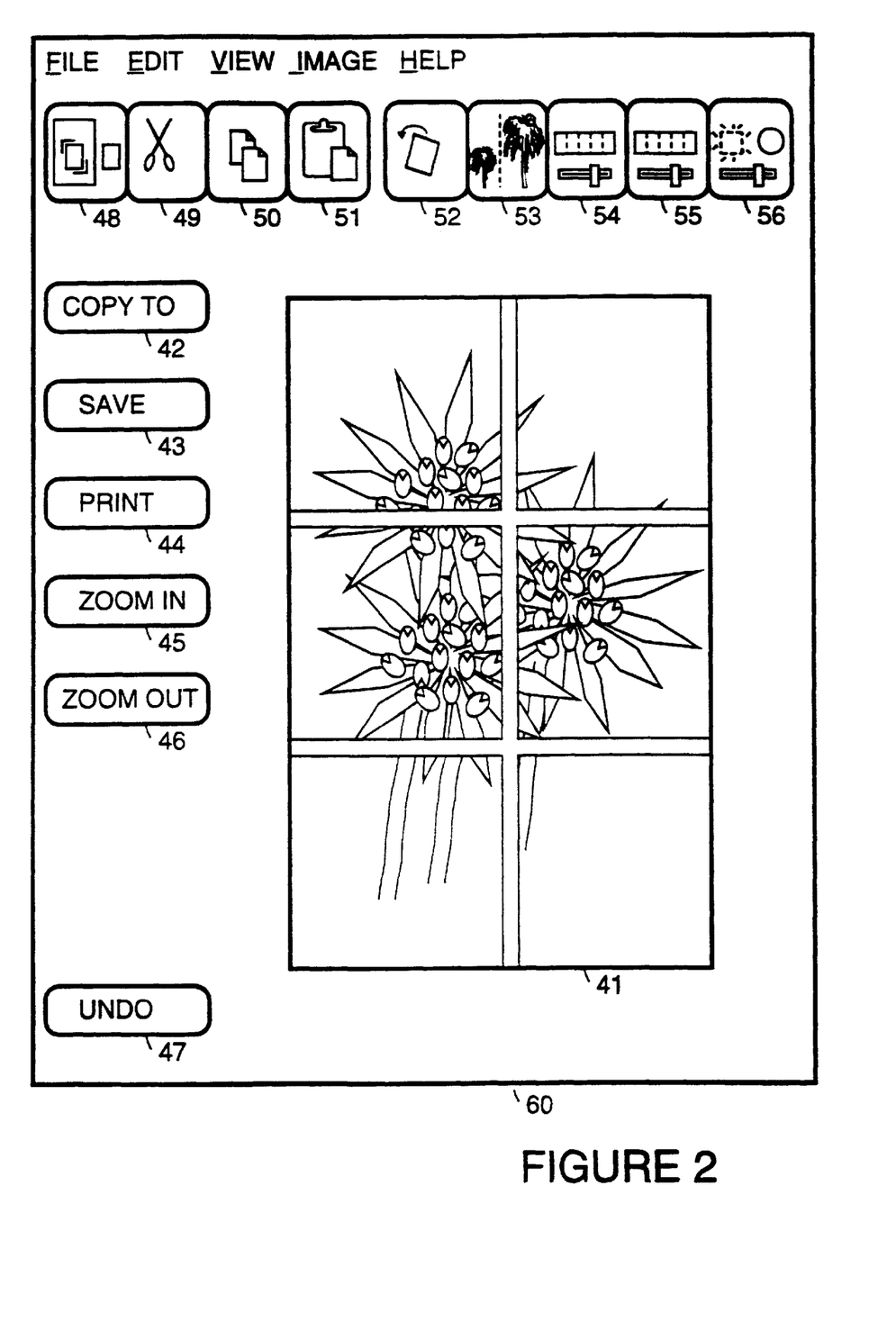
FIG. 2 shows a user interface to an image editor in accordance with a preferred embodiment of the present invention.
Figure 3:
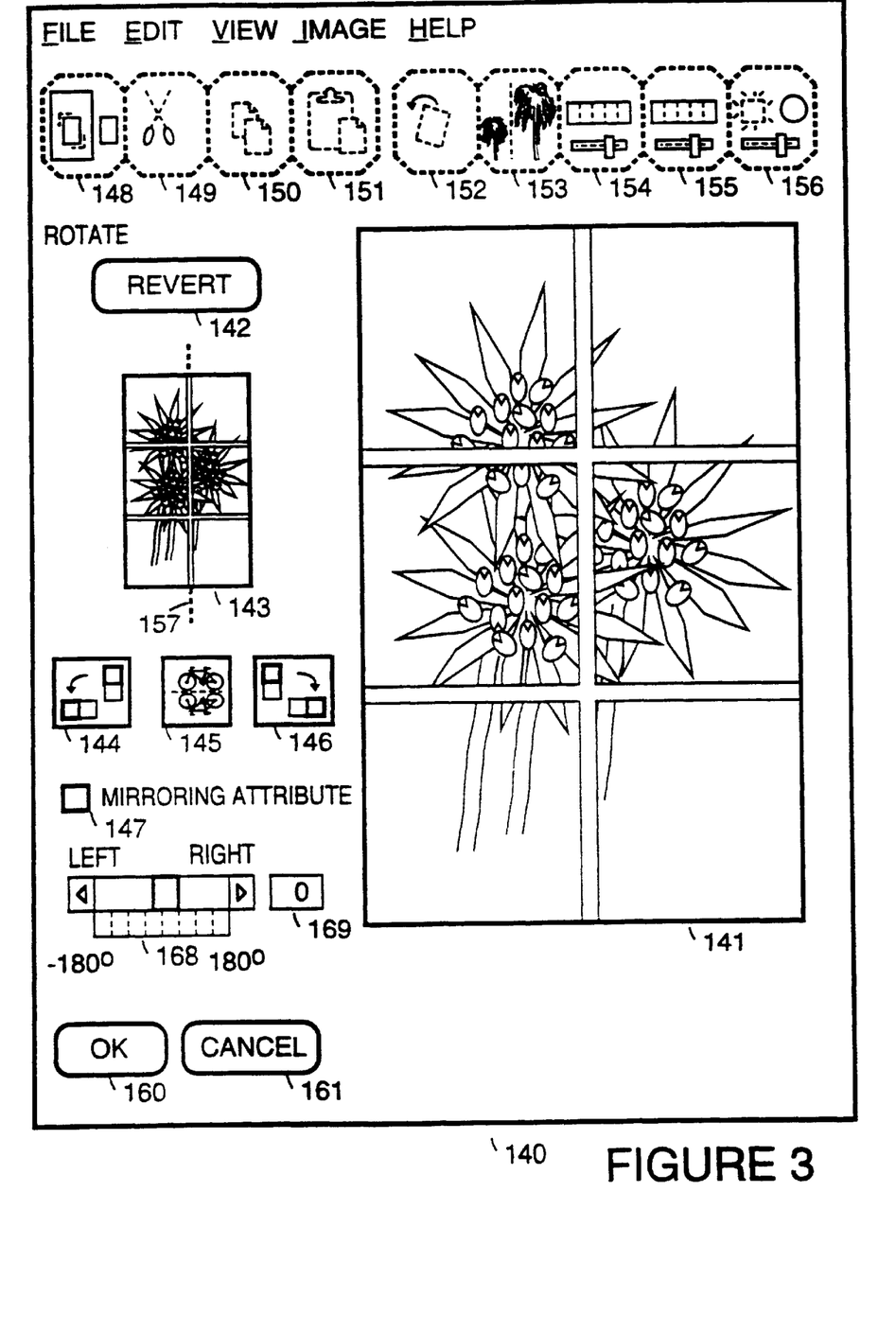
FIG. 3 shows a user interface to rotation controls for an image editor in accordance with a preferred embodiment of the present invention.

Editor software 11 allows a digitally represented image to be edited. For example, FIG. 2 shows a user interface for editor software 11. In an editing window 60, a digitally represented image 41 is displayed. A user selects a button 42 to copy digitally represented image 41 to another file or application program. A user selects a button 43 to save digitally represented image 41 to the current file. A user selects a button 44 to print digitally represented image 41. A user selects a button 45 to zoom in on a portion of digitally represented image 41. A user selects a button 46 to zoom out on digitally represented image 41. A user selects a button 47 to undo any changes made to digitally represented image 41. A user selects a button 48 to crop a portion of digitally represented image 41. A user selects a button 49 to cut all or a portion of digitally represented image 41. A user selects a button 50 to "paste" a copy of a system clip board. A user selects a button 51 to place all or a portion of digitally represented image 41 on a system clip board. A user selects a button 52 to rotate the position of all or a portion digitally represented image 41. A user selects a button 53 to adjust the size of digitally represented image 41. A user selects a button 54 to adjust the colors of digitally represented image 41. A user selects a button 55 to adjust the brightness and contrast of digitally represented image 41. A user selects a button 56 to adjust the sharpness of digitally represented image 41. When the user selects button 52, a rotation interface 140 is displayed to a user, as shown in FIG. 3. In rotation interface 140, a button 148 is displayed which is a grayed out version of button 48. Button 148 is grayed out to indicate that the functionality represented is not accessible from rotation interface 140. A button 149 is displayed which is a grayed out version of button 49. Button 149 is grayed out to indicate that the functionality represented is not accessible from rotation interface 140. A button 150 is displayed which is a grayed out version of button 50. Button 150 is grayed out to indicate that the functionality represented is not accessible from rotation interface 140. A button 151 is displayed which is a grayed out version of button 51. Button 151 is grayed out to indicate that the functionality represented is not accessible from rotation interface 140. A button 152 is displayed which is a grayed out version of button 52. Button 152 is grayed out to indicate that the functionality represented is not accessible from rotation interface 140. A button 153 is displayed which is a grayed out version of button 53. Button 153 is grayed out to indicate that the functionality represented is not accessible from rotation interface 140. A button 154 is displayed which is a grayed out version of button 54. Button 154 is grayed out to indicate that the functionality represented is not accessible from rotation interface 140. A button 155 is displayed which is a grayed out version of button 55. Button 155 is grayed out to indicate that the functionality represented is not accessible from rotation interface 140. A button 156 is displayed which is a grayed out version of button 56. Button 156 is grayed out to indicate that the functionality represented is not accessible from rotation interface 140.

A base image 141 represents a base image for digitally represented image 41 (shown in FIG. 2). A thumbnail sketch 143 of base image 141 is also shown. A user rotates the image of thumbnail sketch 143 90° to the left using a button 144. A user rotates the image of thumbnail sketch 143 90° to the right using a button 146. A user performs a flip (i.e., rotates the existing thumbnail sketch 143 by 180°, followed or proceeded by a performing a mirroring operation of thumbnail sketch 143 mirror around an axis 157) using a button 145.

A slider bar 168 can be used to adjust the angle of rotation (R) of the image of thumbnail sketch. A box 169 indicates the current angle of rotation of the image of thumbnail sketch 143. In the preferred embodiment, the convention for the value shown in box 169 is that rotation to the right results in positive angle change from 0° to 180°. Rotation to the left results in negative angle value change from 0° to −180°. The location the bar of slider bar 148 and the value in box 169 are adjusted automatically when the user selects button 144, button 145, button 146 or slider bar 168.

A user selects a mirroring attribute check box 147 to mirror the image displayed as thumbnail sketch 143. The mirroring attribute is independent of the angle of rotation image of the image. That is, the mirror attribute performs a function that is the equivalent of a mirror around an axis 157 which rotates with the image. For the unrotated image, axis 157 is vertical. As the image is rotated, axis 157 is rotated with the image.

Figure 7:
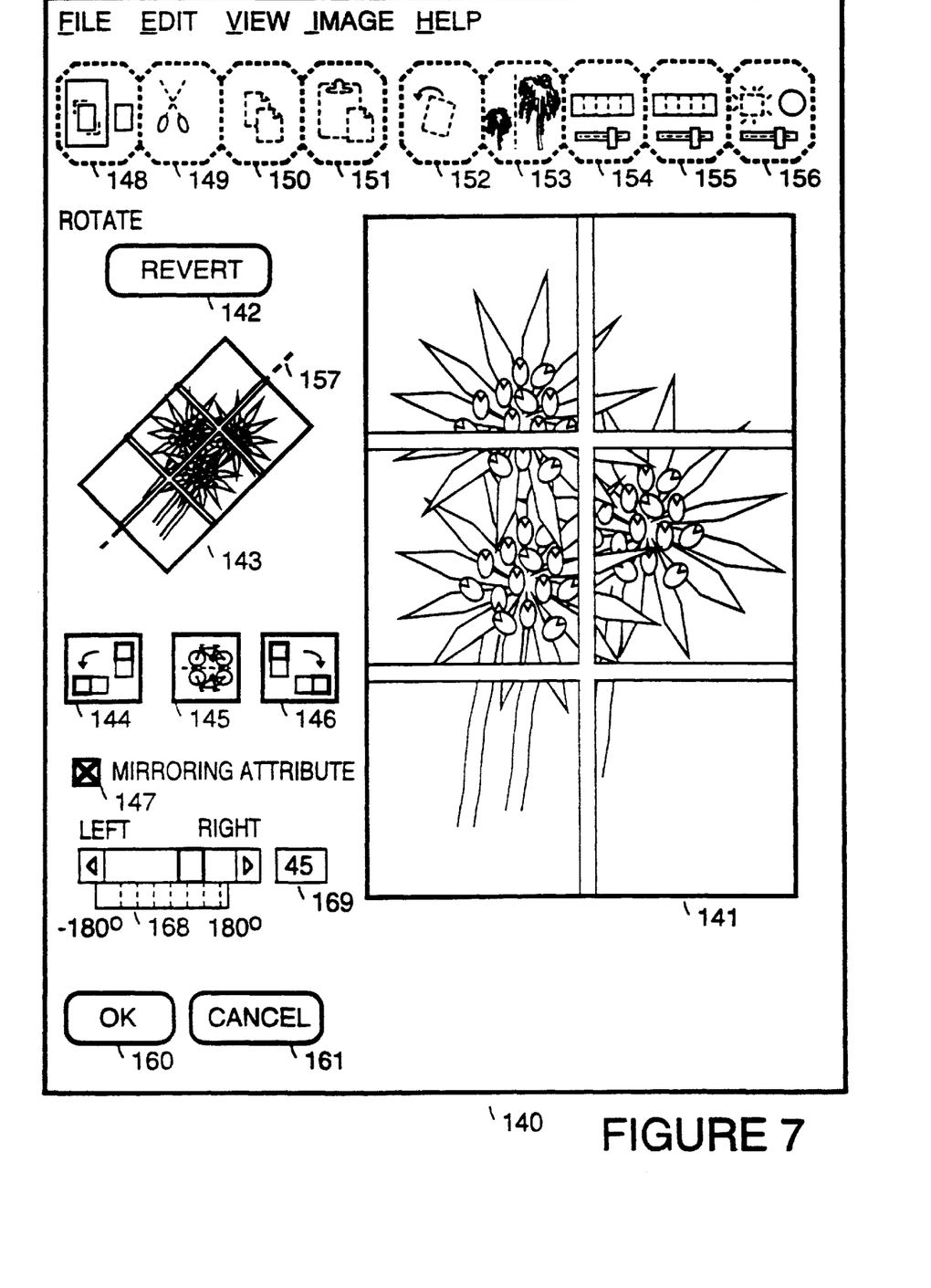

For example, when the image of thumbnail sketch 143 is not rotated (R=0), the mirroring attribute is the equivalent of a flip around axis 157 which is a vertical axis which extends up the middle of the image of thumbnail sketch 143. When the image of thumbnail sketch 143 is rotated 90° to the right (R=90) in the mirror on (or "checked" state), the mirroring attribute is the equivalent of a flip around axis 157 which is then a horizontal axis which extends across the middle of the image of thumbnail sketch 143. When the image of thumbnail sketch 143 is rotated 45° to the right (R=45), the mirroring attribute is the equivalent of a flip around axis 157 which is then a 45° axis which extends through the middle of the image of thumbnail sketch 143 (This is illustrated by FIG. 7 as more fully described below). The selection and de-selection of mirroring attribute check box 147 changes automatically when the user selects button 145.

A user selects a REVERT button 142 to revert changes made to thumbnail sketch 143 back to values represented by base image 141. A user selects an OK button 160 to return to editing window 60 (shown in FIG. 2) with displayed image 41 having the rotation and mirroring attribute represented by the current state thumbnail image 143 and controls 147 and 168. A user selects a CANCEL button 161 to return to editing window 60 (shown in FIG. 2) with the displayed image having the rotation and mirroring attributes represented by base image 141 (i.e., digitally represented image 41 is displayed unchanged).

Figure 4:
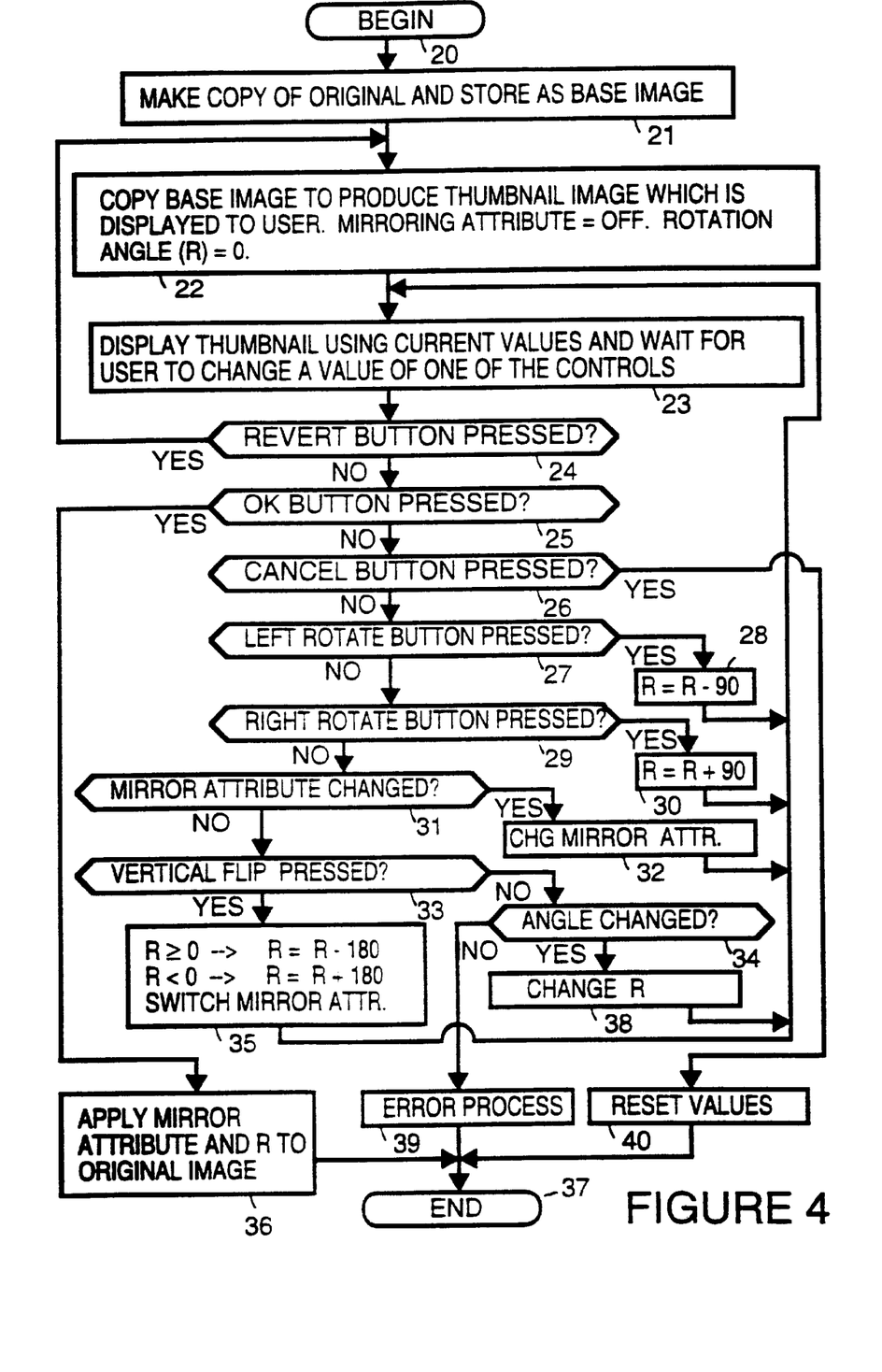
FIG. 4 is a flowchart which represents rotation interfaces used to rotate and mirror a digitally represented image in accordance with a preferred embodiment of the present invention.

FIG. 4 is a flowchart which implements the adjust rotation interface shown in FIG. 3. The implementation allows a user to preview multiple trial changes to image 41 as displayed in thumbnail image 143. Changes to rotation and mirroring attribute are initially made to thumbnail image 143 and can be evaluated by a user prior to applying changes to base image 141. The "trial" changes may be made by the user independently, in any order, and perhaps multiple times prior to being applied to base image 141.

In a step 20, the user has selected button 52 in editing window 60 (shown in FIG. 2) to display rotation interface 140 (shown in FIG. 3).

In a step 21, a copy of digitally represented image 41 (shown in FIG. 2) is copied to produce a base image which is displayed as base image 141 (shown in FIG. 3). For example, base image 141 is a smaller size than original image 41, and, depending upon implementation, can be a thumbnail size copy of original image 41. Alternatively, base image 141 can be the same size as original image 41.

In a step 22, base image 141 (shown in FIG. 3) is copied to produce a thumbnail image which is displayed as thumbnail image 143 (shown in FIG. 3). For example, thumbnail image 143 is a smaller size than base image 141. In step 22, the mirroring attribute is set to off and the angle of rotation (R) is set equal to zero.

In a step 23, the current thumbnail image is displayed using the current values for R and the mirroring attribute. The rotation interface waits for the user to change any control made available to the user. For example, FIG. 3 shows that controls are available for rotation 90° left (button 144), rotation 90° right (button 146), flip vertical (button 145), mirroring attribute (mirroring attribute check box 147), angle of rotation (slider bar 168), angle of rotation (text box 169), revert (REVERT button 142), OK (OK button 160) and cancel (CANCEL button 161).

In a step 24, if REVERT button 142 is selected, the rotation interface returns to step 22. In step 24, if REVERT button 142 is not selected, the rotation interface continues to a step 25.

In step 25, if OK button 160 is selected, the rotation interface jumps ahead to a step 36. In step 25, if OK button 150 is not selected, the rotation interface continues to a step 26. In step 26, if CANCEL button 151 is selected, the rotation interface jumps ahead to a step 40. In step 40 the angle of rotation is set to zero (R=0) and the mirroring attribute is set of OFF. From step 40, the rotation interface proceeds to a step 37. In step 26, if CANCEL button 151 is not selected, the rotation interface continues to a step 27.

In step 27, if left rotate 90° button 144 has been selected, in a step 28, then 90° is subtracted from the angle of rotation (R=R−90) and R is further modified, if necessary, to fall in the range of −180° to 180°, inclusive. Specifically, if this results in a value less than −180°, then 360° is added to the angle of rotation (R=R+360). The image of thumbnail sketch 143 is rotated to reflect the new angle of rotation. The new angle of rotation is displayed in box 169 and slider bar 168 is adjusted accordingly. The rotate interface then returns to step 23. In step 27, if left rotate 90° button 144 is not selected, the rotation interface continues to a step 29.

In step 29, if right rotate 90° button 146 has been selected, in a step 30, then 90° is added to the angle of rotation (R=R+90) and R is further modified, if necessary, to fall in the range of −180° to 180°, inclusive. Specifically, if this results in a value greater than 180°, then 360° is subtracted from the angle of rotation (R=R−360). The image of thumbnail sketch 143 is rotated to reflect the new angle of rotation. The new angle of rotation is displayed in box 168 and slider bar 169 is adjusted accordingly. The rotate interface then returns to step 23. In step 29, if right rotate 90° button 146 is not selected, the rotation interface continues to a step 31.

In step 31, if the value in mirroring attribute check box 147 has been changed (either from unselected to selected, or from selected to unselected), in a step 32, the image of thumbnail sketch 143 is mirrored around axis 157 which varies from vertical by the current value of R (i.e., axis 157 rotates with the image of thumbnail sketch 143). The rotate interface then returns to step 23. In step 31, if the value in mirroring attribute check box 147 has not been changed, the rotation interface continues to a step 33.

Figure 5:
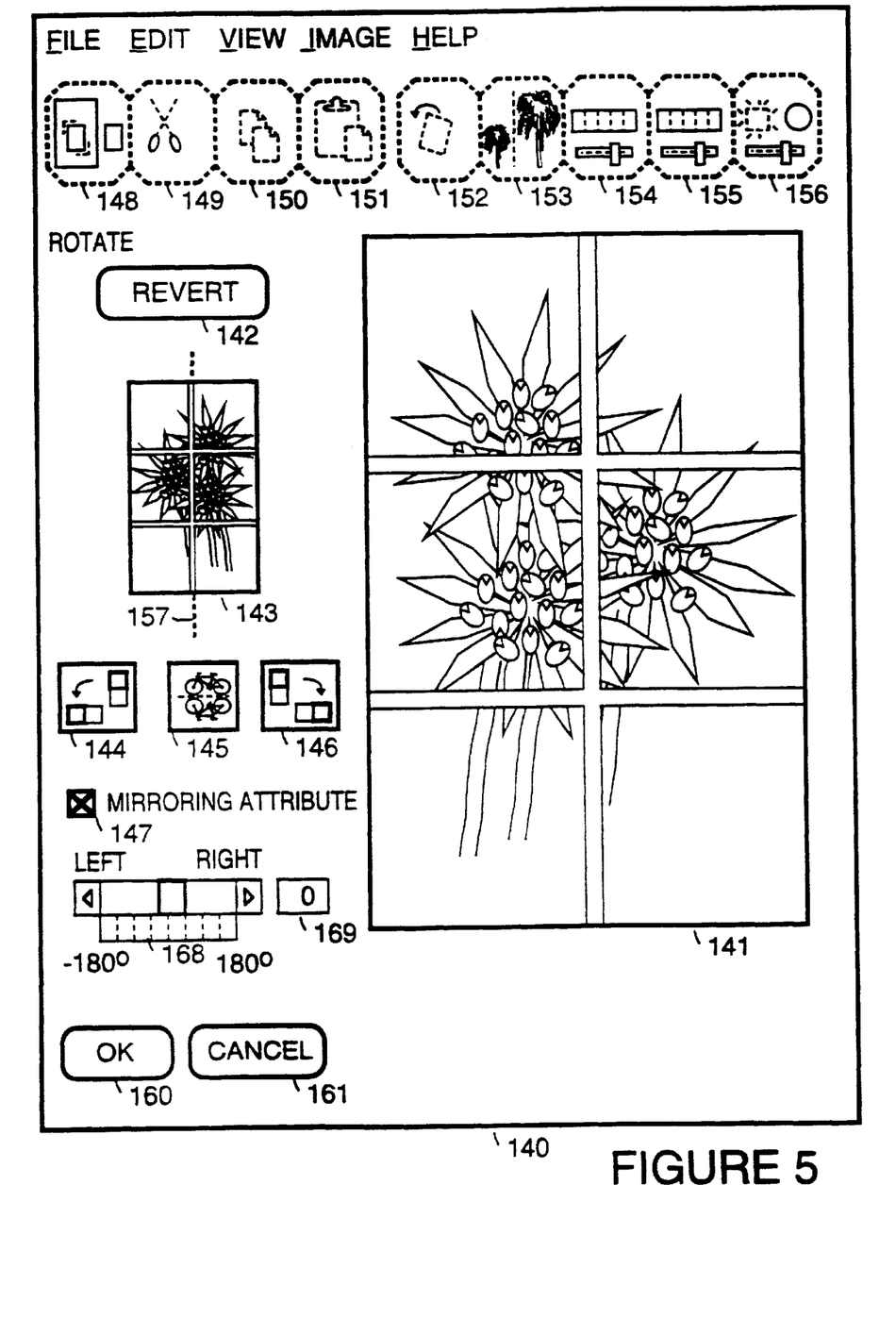
FIG. 5, FIG. 6, FIG. 7 and FIG. 8 shows the user interface to rotation controls for an image editor as shown in FIG. 3 in various stages of rotation and mirroring a displayed image in accordance with a preferred embodiment of the present invention.

For example, FIG. 5 shows the mirroring attribute having been selected (by selecting mirroring attribute check box 147). The image of thumbnail sketch 143 has been mirrored around a vertical axis since the current value of R is 0.

In step 33 (shown in FIG. 4), if flip button 145 has not been selected, in a step 34, a check is made to see if the slider angle 168 has changed or the value in text box 169 has changed. If so, this means that the user has changed the value of the angle of rotation, either by adjusting the location of slider bar 168 or typing a new number into box 169. If in step 34 the rotation angle has changed, in a step 38, the angle R is updated and the rotation interface continues to step 23 where the new angle of rotation is reflected in the new display of thumbnail sketch 143 is updated.

Figure 6:
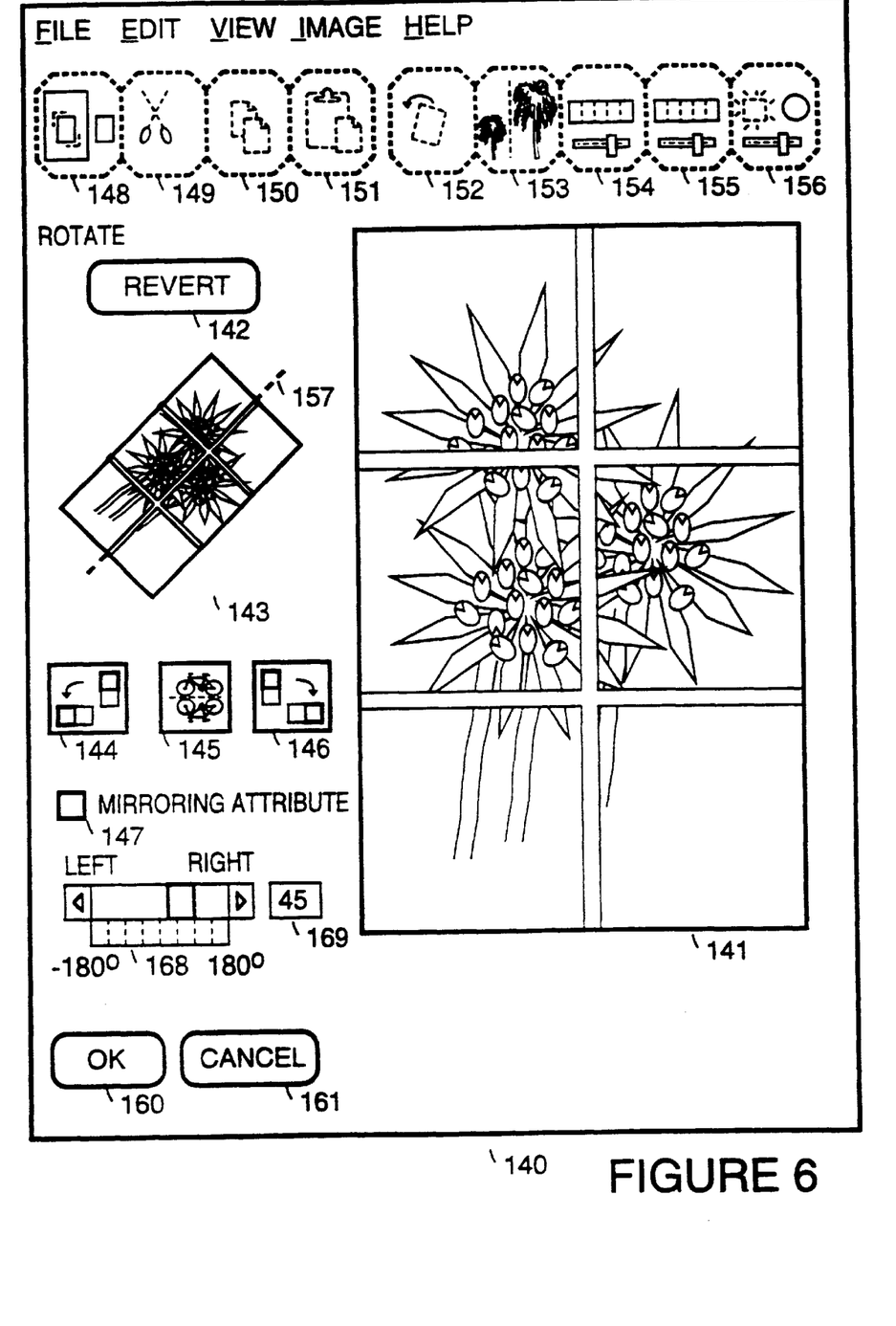

For example, FIG. 6 shows the current value of R being listed in box 169 as 45°. The image of thumbnail sketch 143 has been rotated to reflect the new angle of rotation of 45°.

If the mirroring attribute is then selected, as shown in FIG. 7, the image of thumbnail sketch 143 is mirrored around axis 157 which has rotated with the image of thumbnail sketch 143 (i.e., 45° to the right of vertical).

In step 34, if the slider angle has not changed and the value in text box 169 has not changed, in a step 39, error processing is performed. Then the rotation interface proceeds to step 37.

In step 33 (shown in FIG. 4), if flip button 145 has been selected, in a step 35, a flip (180° rotation and mirror around axis 157) of the existing image is performed. If the angle of rotation before flipping is greater than or equal to 0°, the new angle of rotation is 180° less than the current value of the angle of rotation (R=R−180). If the angle of rotation before flipping is less than 0°, the new angle of rotation is 180° more the current value of the angle of rotation (R=R+180). The new angle of rotation is displayed in box 169 and slider bar 168 is adjusted accordingly. Additionally, the value in mirroring attribute check box 147 is changed (either from unselected to selected, or from selected to unselected). The rotate interface then returns to step 23 where the image of thumbnail sketch 143 is mirrored or not mirrored around axis 157 depending on the value in mirroring attribute check box 147, and the image of thumbnail sketch 143 is rotated to reflect the new angle of rotation.

Figure 8:
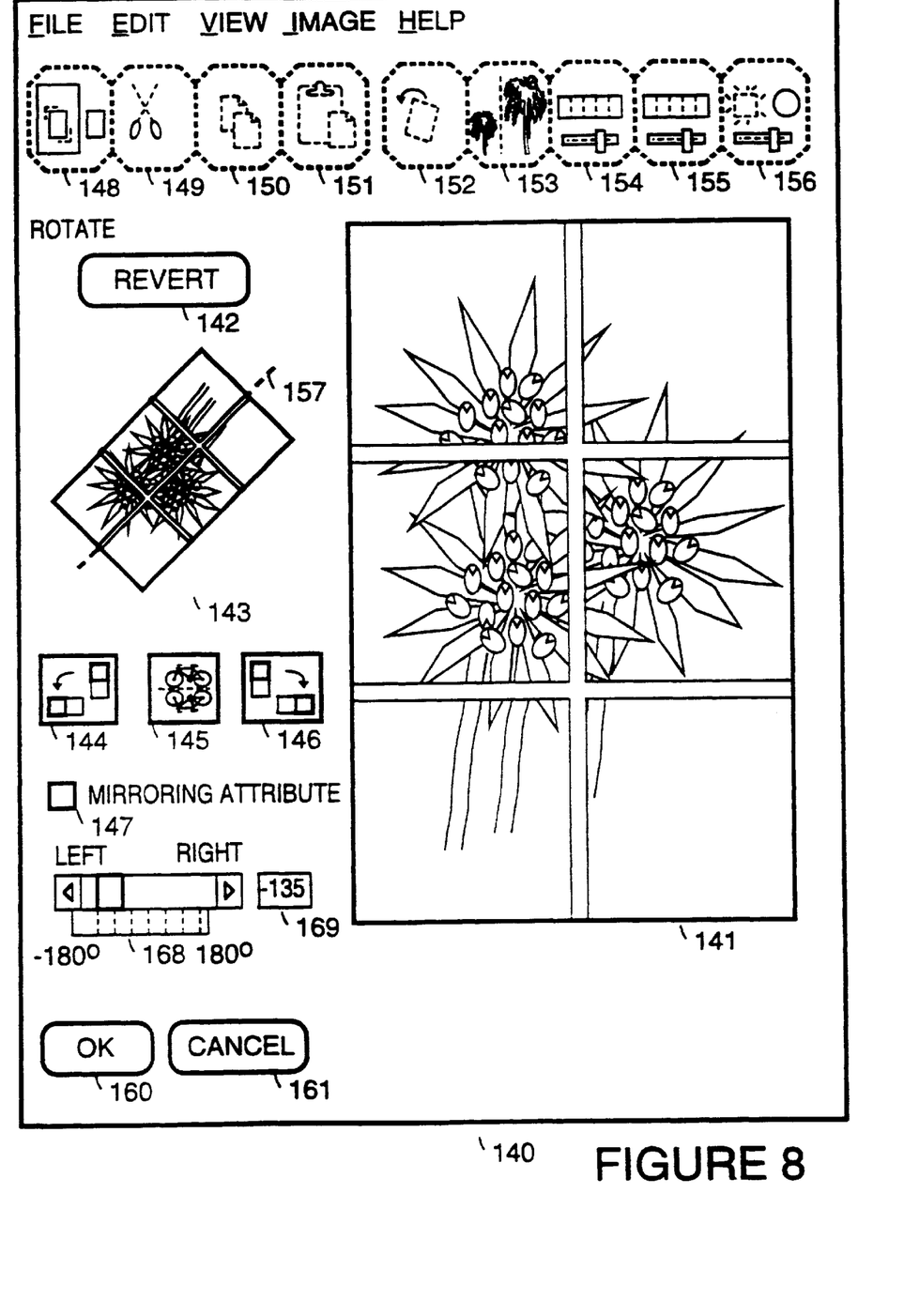

For example, if flip button 145 is selected when the image of thumbnail sketch 143 is as is shown in FIG. 7, the result is shown in FIG. 8. In FIG. 8, angle of rotation of the image of thumbnail sketch 143 has been changed from 45° (in FIG. 7) to −135° (in FIG. 8). In addition, the mirroring attribute has been changed from being selected (in FIG. 7) to being unselected (in FIG. 8).

In step 36 (shown in FIG. 4), the current angle of rotation (R) and mirroring image attribute (selected or unselected) are applied to the original image. The resulting image is used as the new digitally represented image to be displayed to the user (in the interface shown in FIG. 2).

In step 37, the rotation interface is closed and editing window 60 is reopened. The new digitally represented image (with the modified angle R and mirroring attribute) is displayed.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method for implementing a rotation interface for an image, the method comprising the following steps:

(a) presenting a graphical interface to a user, the graphical interface having a rotation control and a mirroring attribute control;

(b) in response to the user using the rotation control to select a current angle of rotation, rotating the image to the current angle of rotation; and, (c) in response to the user selecting the mirroring attribute control, mirroring the image by flipping the image around a first axis, the first axis being rotated based on the current angle of rotation, wherein as the current angle of rotation is varied, the first axis is correspondingly rotated.

2. A computer implemented method as in claim 1 wherein in step (a) the rotation control is a slider bar.

3. A computer implemented method as in claim 1 wherein in step (a) the rotation control is a text box.

4. A computer implemented method as in claim 1 wherein in step (a) the rotation control is a rotate left 90° button.

5. A computer implemented method as in claim 1 wherein in step (a) the rotation control is a rotate right 90° button.

6. A computer implemented method as in claim 1 additionally comprising the following step:

(c) in response to selecting a flip control, flipping the image, including the following substeps:

(c.1) adjusting the current angle of rotation for the rotation control by 180°, and (c.2) toggling a current state of the mirroring attribute control to reflect a current mirrored state of the image resulting from flipping the image.

7. Storage media for storing software, which when executed on a computing system, performs a method for implementing a rotation interface for an image, the method comprising the following steps:

(a) presenting a graphical interface to a user, the graphical interface having a rotation control, and a mirroring attribute control;

(b) in response to the user using the rotation control to select a current angle of rotation, rotating the image to the current angle of rotation; and, (c) in response to the user selecting the mirroring attribute control, mirroring the image by flipping the image around a first axis, the first axis being rotated based on the current angle of rotation, wherein as the current angle of rotation is varied, the first axis is correspondingly rotated.

8. Storage media as in claim 7 wherein in step (a) the rotation control is a slider bar.

9. Storage media as in claim 7 wherein in step (a) the rotation control is a text box.

10. Storage media as in claim 7 wherein in step (a) the rotation control is a rotate left 90° button.

11. Storage media as in claim 7 wherein in step (a) the rotation control is a rotate right 90° button.

12. Storage media as in claim 7, wherein the method additionally comprises the following step:

(c) in response to selecting a flip control, flipping the image, including the following substeps:

(c.1) adjusting the current angle of rotation for the rotation control by 180°, and (c.2) toggling a current state of the mirroring attribute control to reflect a current mirrored state of the image resulting from flipping the image.

13. A rotation interface of an image editor, comprising:

a rotation control for selecting a current angle of rotation and for rotating an image to the current angle of rotation; and, mirroring attribute control for, in response to a user selection, mirroring the image by flipping the image around a first axis, the first axis being rotated based on the current angle of rotation, wherein as the current angle of rotation is varied, the first axis is correspondingly rotated.

14. A rotation interface as in claim 13 wherein the rotation control is a slider bar.

15. A rotation interface as in claim 13 wherein the rotation control is a text box.

16. A rotation interface as in claim 13 wherein the rotation control is a rotate left 90° button.

17. A rotation interface as in claim 13 wherein the rotation control is a rotate right 90° button.

18. A rotation interface as in claim 13 additionally comprising:

a flip vertical control for flipping the image, in response to being selected, the flip vertical control adjusts the current angle of rotation by 180°, and the flip vertical control toggles a current state of the mirroring attribute control to reflect a current mirrored state of the image resulting from flipping the image.

19. A computer implemented method for implementing a rotation interface for an image, the method comprising the following steps:

(a) in response to a rotation control selecting a current angle of rotation, rotating an image to the current angle of rotation, wherein the rotation control is a slider bar; and, (b) in response to selecting a mirroring attribute control, mirroring the image by flipping the image around a first axis, the first axis being varied from vertical by the current angle of rotation.

20. A rotation interface of an image editor, comprising:

a rotation control for selecting a current angle of rotation and for rotating the image to the current angle of rotation, wherein the rotation control is a slider bar; and, mirroring attribute control for, in response to a user selection, mirroring the image by flipping the image around a first axis, the first axis being varied from vertical by the current angle of rotation.

* * * * *